(12) United States Patent
Johnson

(10) Patent No.: US 7,988,137 B2
(45) Date of Patent: Aug. 2, 2011

(54) ADJUSTABLE STAND

(75) Inventor: Bryan T. Johnson, Vadnais Heights, MN (US)

(73) Assignee: Innovative Tools & Technologies, Inc., St. Paul, MN (US)

( * ) Notice: Subject to any disclaimer, the term of this patent is extended or adjusted under 35 U.S.C. 154(b) by 473 days.

(21) Appl. No.: 12/257,615

(22) Filed: Oct. 24, 2008

(65) Prior Publication Data

US 2009/0108148 A1    Apr. 30, 2009

Related U.S. Application Data

(60) Provisional application No. 60/982,853, filed on Oct. 26, 2007.

(51) Int. Cl.
*B23Q 3/00* (2006.01)

(52) U.S. Cl. ............... 269/16; 269/17; 269/60; 269/71; 248/166; 248/164

(58) Field of Classification Search ............... 248/166, 248/164, 157, 129, 127, 132, 371, 125.1, 248/176.1, 346.3, 463, 188.2, 188.8, 188.6, 248/274.1, 128, 133, 176.3; 269/16, 71, 269/17, 55, 60, 69; 280/79.3; 211/200, 189, 211/195, 13; 108/118, 157
See application file for complete search history.

(56) References Cited

U.S. PATENT DOCUMENTS

| | | | |
|---|---|---|---|
| 2,803,872 A | 8/1957 | Massa | |
| 4,061,305 A | 12/1977 | Beekenkamp | |
| 4,183,511 A * | 1/1980 | Marek | 269/17 |
| 4,763,865 A * | 8/1988 | Danner | 248/164 |
| 4,974,525 A | 12/1990 | Sheffield | |
| 5,135,205 A * | 8/1992 | Bedard | 269/17 |
| 5,296,030 A * | 3/1994 | Young | 118/500 |
| 5,984,245 A * | 11/1999 | Hsu | 248/164 |
| 6,173,947 B1 * | 1/2001 | Johnson | 269/17 |
| 6,409,128 B1 * | 6/2002 | Deshler | 248/127 |
| 7,448,606 B1 * | 11/2008 | Johnson | 269/17 |
| 2008/0142652 A1 * | 6/2008 | Johnson | 248/176.1 |

OTHER PUBLICATIONS

U.S. Appl. No. 60/982,853, filed Oct. 26, 2007, Bryan T. Johnson.
"The Scissors Stand," datasheet [online]. Collision Services, Inc. Website copyright date: 2003. Particular website page copyright date: Unknown. Retrieved on Mar. 2, 2009 from the Internet: <URL:http:www.collisionservices.com/acb/showdetl.cfm?&User_ID=744682&St=4691&St2=46838205&St3=-31124990&DS_ID=3&Product_ID=360&DID=7>; 2 pgs.
"Folding Bench—500 lb." datasheet [online]. Collision Services, Inc. Website copyright date: 2003. Particular website page copyright date: Unknown. Retrieved on Mar. 2, 2009 from the Internet: <URL:http:www.collisionservices.com/acb/showdetl.cfm?&User_ID=744682&St=4691&St2=46838205&St3=-31124990&DS_ID=3&Product_ID=358&DID=7>; 2 pgs.

(Continued)

*Primary Examiner* — Terrell Mckinnon
*Assistant Examiner* — Todd M. Epps
(74) *Attorney, Agent, or Firm* — Mueting, Raasch & Gebhardt, P.A.

(57) ABSTRACT

An adjustable stand for receiving an object, e.g., an automobile panel.

20 Claims, 6 Drawing Sheets

OTHER PUBLICATIONS

"Folding Bench—Lightweight," datasheet [online]. Collision Services, Inc. Website copyright date: 2003. Particular website page copyright date: Unknown. Retrieved on Mar. 2, 2009 from the Internet: <URL:http:www.collisionservices.com/acb/showdetl.cfm?&User_ID=744682&St=4691&St2=46838205&St3=-31124990&DS_ID=3&Product_ID=2423&DID=7>; 2 pgs.

* cited by examiner

ADJUSTABLE STAND

CROSS-REFERENCE TO RELATED APPLICATIONS

This application claims the benefit of U.S. Provisional Application Ser. No. 60/982,853 filed 26 Oct. 2007, entitled "Adjustable Panel Stand," which is incorporated herein by reference in its entirety.

BACKGROUND

The disclosure herein relates generally to an adjustable stand for receiving an object, e.g., a door panel from an automobile, such that a user, e.g., may repair and/or paint the object.

Supporting objects (e.g., automobile panels) for repair and/or to be painted can be difficult. For example, surfaces of objects are often contoured and/or shaped, and as a result, supporting such objects without damaging the objects may be difficult.

Adjustable stands for receiving objects have been described. For example, U.S. Pat. No. 2,803,872 to Massa and U.S. Pat. No. 4,974,525 to Sheffield disclose various adjustable stand designs.

SUMMARY

The disclosure herein relates generally to an adjustable stand that may receive an object (e.g., a stand for receiving an object to be repaired, a method for adjusting a stand, etc.).

In one embodiment of an adjustable stand, the adjustable stand may be used to receive objects of many shapes and/or sizes such that a user may repair and/or paint the objects. For example, the adjustable stand may include two adjustable arms that each may be vertically adjusted along a vertical axis without changing the horizontal width between the two arms. Further, for example, each arm may include a resting member that may be pivotally adjusted about a pivot axis. The resting members may both be padded. Using the aforementioned vertical and pivotal adjustments, the resting members may be positioned to fit the contours of multiple different types of objects.

In another embodiment of a stand for receiving an object, the stand includes a first and a second frame support member, a first and a second lower support member for engaging a ground surface, a first and a second adjustment portion, a first and a second arm, and a first and a second resting member for contacting the object when received by the stand. Each of the first and the second frame support members extends from a bottom end to a top end and the first frame support member is coupled to the second frame support member at a crossing location located between the bottom end and the top end of each of the first and the second frame support members. The first lower support member is coupled to the bottom end of the first frame support member and the second lower support member is coupled to the bottom end of the second frame support member. The first adjustment portion is coupled to the top end of the first frame support member and the second adjustment portion is coupled to the top end of the second frame support member. The first adjustment portion defines a first vertical axis and the second adjustment portion defines a second vertical axis. Each of the first and the second arms extends from a proximal end to a distal end. The first arm is adjustably coupled to the first adjustment portion for movement along the first vertical axis and the second arm is adjustably coupled to the second adjustment portion for movement along the second vertical axis. The first resting member is pivotally coupled to the distal end of the first arm for movement about a first pivot axis and the second resting member is pivotally coupled to the distal end of the second arm for movement about a second pivot axis.

In still another embodiment of a stand for receiving an object, the stand includes a first and a second frame support member and a first and a second resting member for contacting the object when received by the stand. Each of the first and the second frame support members extends from a bottom end to a top end and the first frame support member is coupled to the second frame support member. The first resting member is adjustably coupled to the top end of the first frame support member for vertical movement and for movement about a first pivot axis. Further, the first resting member is adjustable for movement about the first pivot axis separately from the adjustment of the vertical movement of the first resting member. The second resting member is adjustably coupled to the top end of the second frame support member for vertical movement and for movement about a second pivot axis. Further, the second resting member is adjustable for movement about the second pivot axis separately from adjustment of the vertical movement of the second resting member. Still further, the first pivot axis and the second pivot axis are parallel.

In yet still another embodiment of a stand for receiving an object, the stand includes a first and a second frame support member, a first and a second arm, and a first and a second resting member for contacting the object when received by the stand. Each of the first and the second frame support members extends from a bottom end to a top end. The first frame support member is coupled to the second frame support member at a crossing location located between the bottom end and the top end of each of the first and the second frame support members. Further, each of the first and the second arms extends from a proximal end to a distal end. The first arm is adjustably coupled to the top end of the first frame support member for vertical movement and the second arm is adjustably coupled to the top end of the second frame support member for vertical movement. Still further, the first resting member is pivotally coupled to the distal end of the first arm for movement about a first pivot axis and the second resting member is pivotally coupled to the distal end of the second arm for movement about a second pivot axis.

In an embodiment of a method of adjusting a stand for receiving an object, the method includes providing a stand. The stand includes a first and a second frame support member, a first and a second arm, and a first and a second resting member for contacting the object when received by the stand. Each of the first and the second frame support members extends from a bottom end to a top end and the first frame support member is coupled to the second frame support member at a crossing location located between the bottom end and the top end of each of the first and the second frame support members. Each of the first and the second arms extends from a proximal end to a distal end. The first arm is adjustably coupled to the top end of the first frame support member for vertical movement and the second arm is adjustably coupled to the top end of the second frame support member for vertical movement. The first resting member is pivotally coupled to the distal end of the first arm for movement about a first pivot axis and the second resting member is pivotally coupled to the distal end of the second arm for movement about a second pivot axis. The method further includes adjusting the first arm vertically, adjusting the second arm vertically, adjusting the first resting member about the first pivot axis, and adjusting the second resting member about the second pivot axis.

The above summary is not intended to describe each embodiment or every implementation of the stands for receiving objects or methods of using such stands. Advantages, together with a more complete understanding, will become apparent and appreciated by referring to the following detailed description and claims taken in conjunction with the accompanying drawings.

DETAILED DESCRIPTION OF EXEMPLARY EMBODIMENTS

Figure 1:
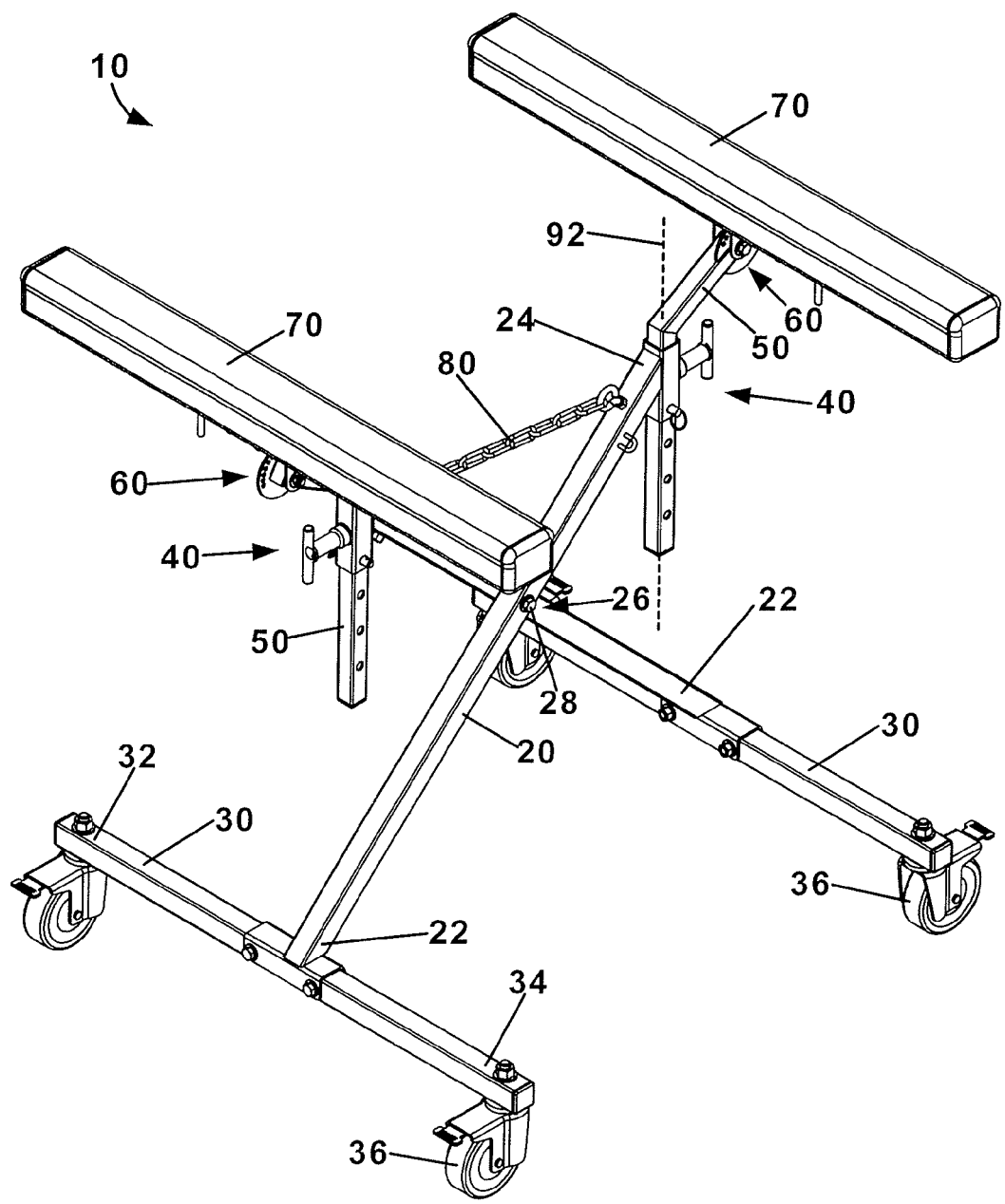
FIG. 1 is a perspective view of an exemplary embodiment of an adjustable stand.
Figure 2:
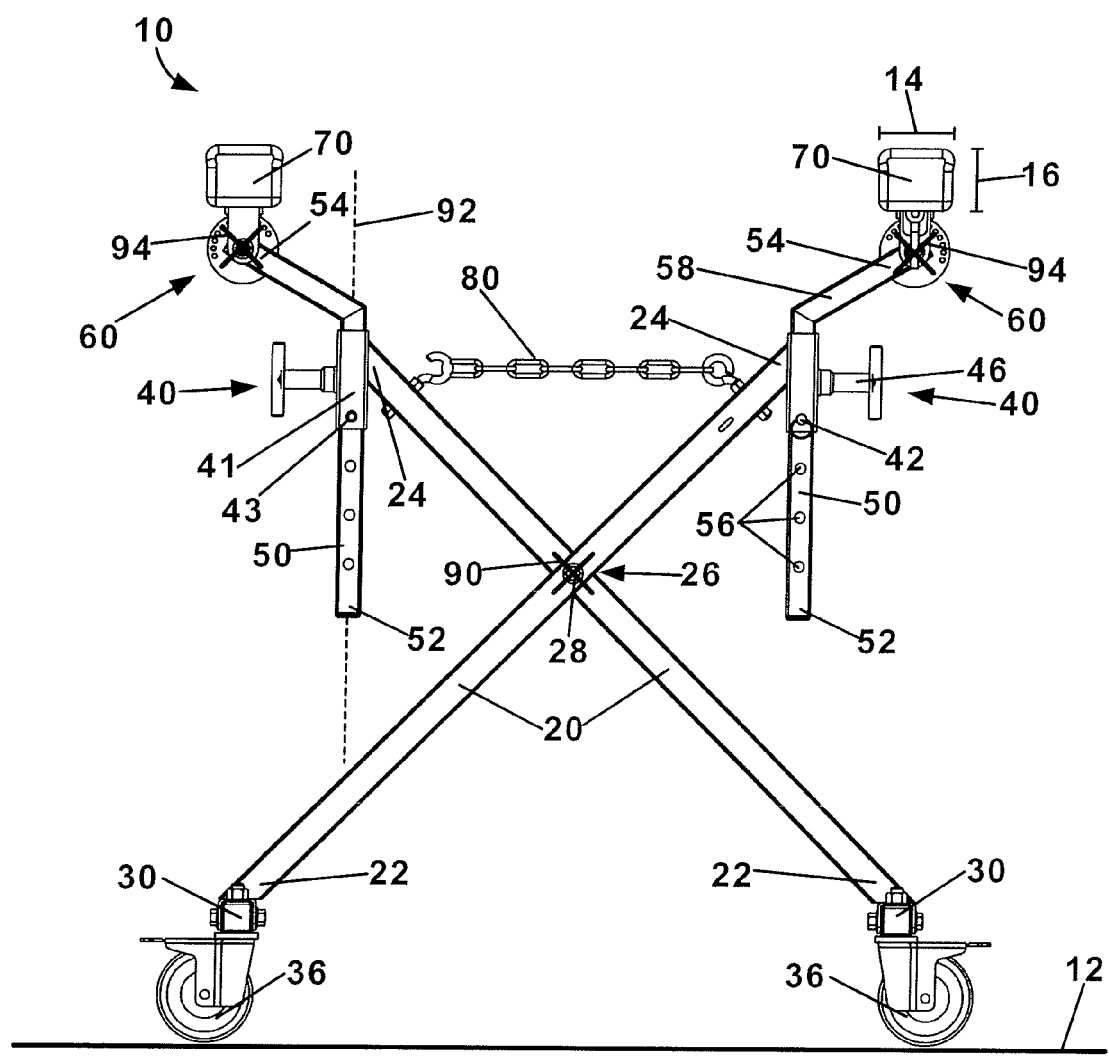
FIG. 2 is a side view of the adjustable stand of FIG. 1.
Figure 3:
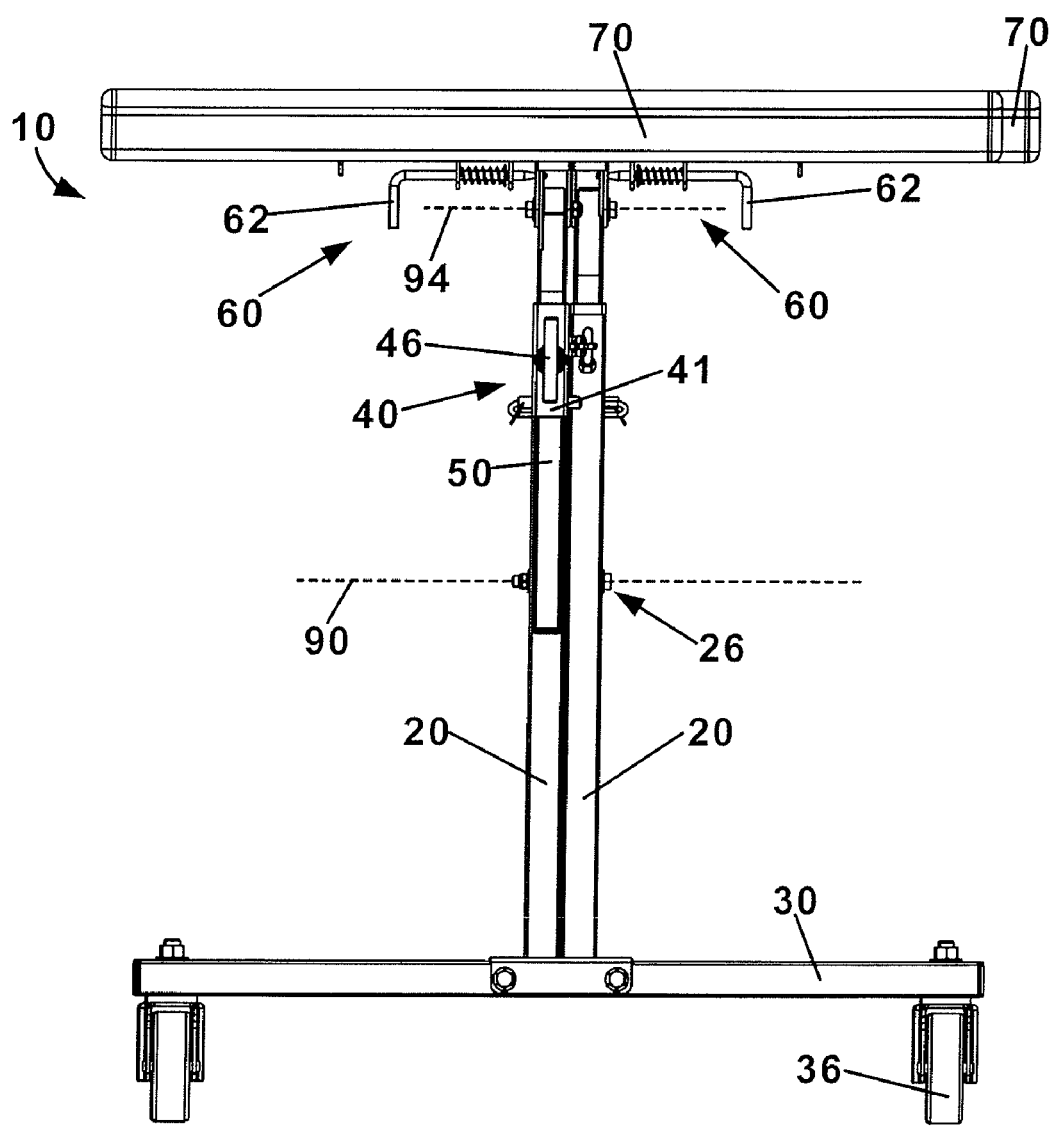
FIG. 3 is another side view of the adjustable stand of FIG. 1.
Figure 4:
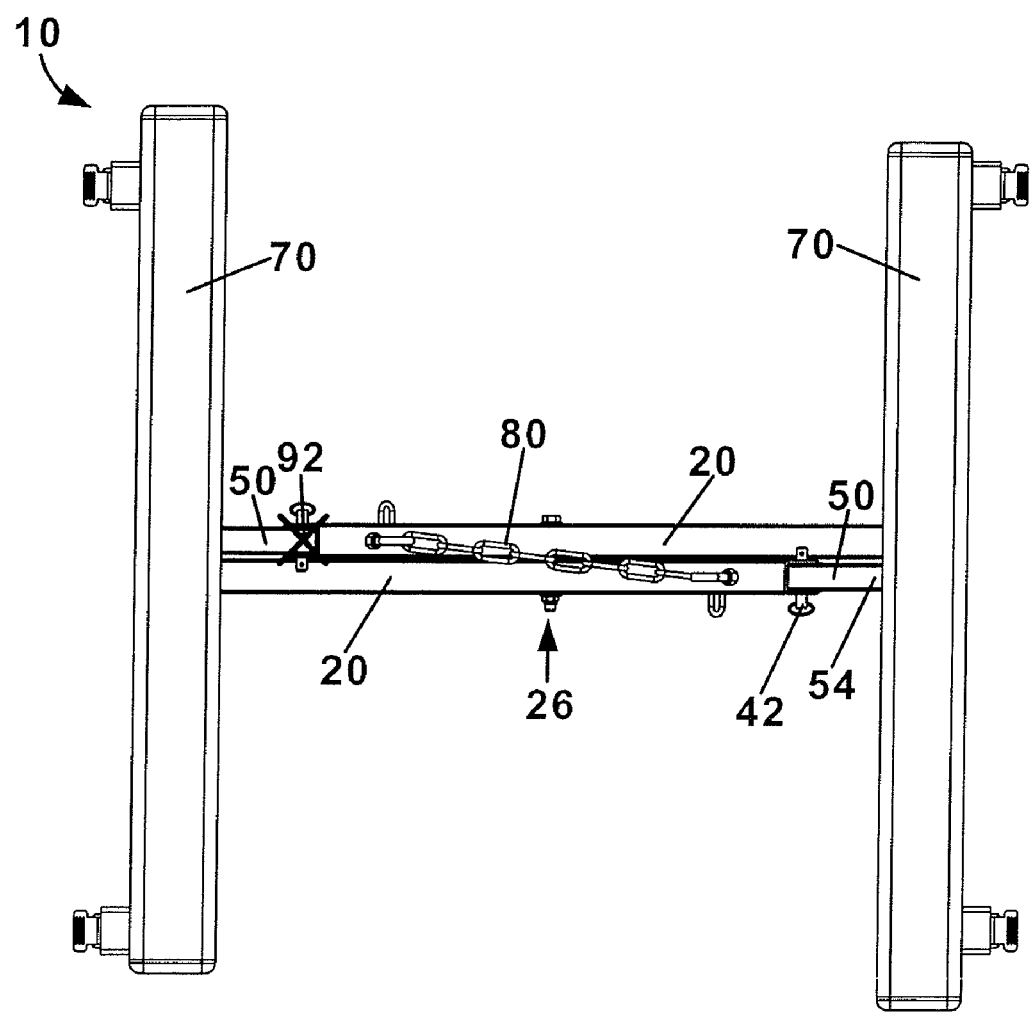
FIG. 4 is a top view of the adjustable stand of FIG. 1.
Figure 5:
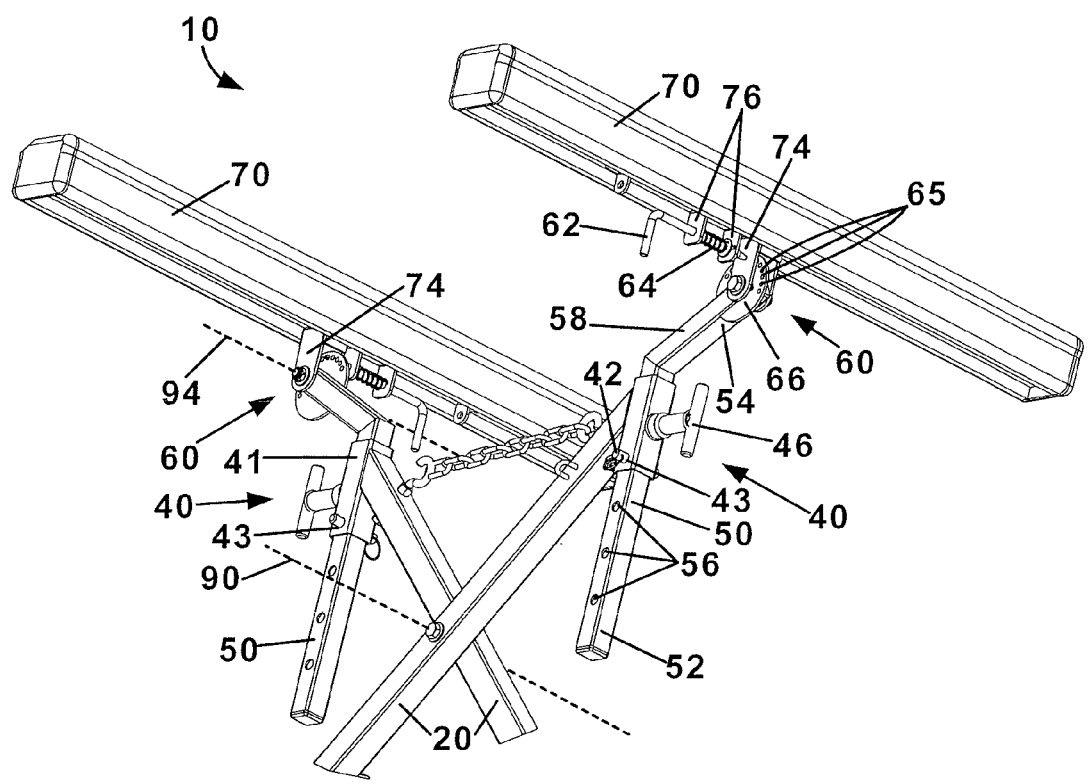
FIG. 5 is a partial perspective view of the adjustable stand of FIG. 1.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from the scope of the disclosure.

An exemplary embodiment of an adjustable stand 10 is shown in FIGS. 1-6. The stand 10 includes two frame support members 20. Each frame support member 20 extends from a bottom end 22 to a top end 24 and may be coupled to each other at a crossing location 26 located between the bottom end 22 and the top end 24 of each of the frame support members 20. In this embodiment, a bolt 28 pivotally couples the frame support members 20 proximate crossing location 26 for pivotal movement about pivot axis 90. The pivot axis 90 may be parallel to the ground surface 12 (see FIG. 2) and may be perpendicular to each of the frame support members 20.

As shown (see FIG. 1), the stand 10 is positioned in a use position. In the use position, for example, the stand 10 is unfolded such that the top ends 24 (and the bottom ends 22) of the frame support members 20 are located away from each other making the stand ready for use, e.g., to be adjusted to fit an object (e.g., an automobile panel).

The stand 10 may also be positioned in a storage position (not depicted). In the storage position, the stand 10 may be folded about the pivot axis 90 bringing the bottom ends 22 and the top ends 24 of the frame support members 20 closer together such that stand 10 may occupy less space than when in the use position.

A coupling element 80 may extend between each of frame support members 20 to, e.g., maintain the positioning (e.g., a particular crossing configuration) of the frame support members 20 relative to each other. In the embodiment depicted in FIGS. 1-6, the coupling element 80 is a chain. In other embodiments, the coupling element 80 may be flexible or inflexible, such as a chain, a rod, a beam, a bolt, and/or any other coupling element as would be known by one having skill in the art suitable to maintain the position of the stand 10 (e.g., the positioning of the frame support members 20 relative to each other).

At least in one embodiment, the frame support members 20 may be movable about the pivot axis 90 relative to each other to adjust the height of the top ends 24 of each frame support member 20. In this embodiment, the coupling element 80 may be used to adjust the height (e.g., relative to a ground surface 12) of the top ends 24 of the frame support members 20 and the width between each top end 24 of the frame support members 20.

In other embodiments, each frame support member 20 may be non-movably coupled in a fixed position relative to each other. Further, such coupling between the frame support members 20 may not be located proximate the crossing location 26. For example, the frame support members 20 may be coupled by a cross support member (not shown) extending between the bottoms ends 22, top ends 24, or anywhere therebetween on the frame support members 20.

As described herein, the stand 10, in effect, has two duplicative halves, each half having its own frame support member 20 and other components coupled therewith. As such, the description herein may only describe a single half of the stand 10 or both halves depending on the context. It is to be understood that any description of a component (e.g., a frame support member) on one half of the stand 10 may also apply to the corresponding component on the other half of the stand 10.

The bottom end 22 of the frame support member 20 may be coupled to a lower support member 30. The lower support member 30 may engage a ground surface 12 to support the stand 10 above the ground surface 12. Wheels 36 may be optionally coupled to the lower support members 30 such that the wheels 36 engage the ground surface 12. Although in the embodiment depicted, the stand 10 includes four wheels, other embodiments may include more than four wheels, less than four wheels, or no wheels. The wheels 36 may further be lockable, e.g., operable to be stopped from rotating.

The lower support member 30 extends from a first end 32 to a second end 34 and may lie parallel to the ground surface 12. In the embodiment depicted, the bottom end 22 of the frame support member 20 is coupled to the approximate middle of the lower support member 30 between either end 32, 34. In other embodiments, the bottom end 22 of the frame support member 20 may be coupled to other locations along the lower support member 30.

In the embodiment depicted, the lower support member 30 is orthogonal to the frame support member 20. In other embodiments, the lower support member 30 may not be orthogonal to the frame support member 20, e.g., curved members, angled members, etc. may be used.

Although the stand 10 as depicted includes lower support members 30, the stand 10 may not include lower support members 30. At least in one embodiment, the bottom ends 22 of the frame support members 20 may be capable of engaging the ground surface 12 to support the stand 10 over the ground surface 12. For example, the bottom ends 22 of the frame support members may fork into at least two portions to provide at least two points of contact with ground surface 12. Further, at least in another embodiment, the bottom ends 22 of the frame support members 20 may be couplable to another apparatus already secured to the ground surface. Still further, at least in another embodiment, the stand 10 may include two sets of frame support members 20 with each set spaced apart from each other such that the stand 10 has four points of contact with the ground surface 12 such that lower support members 30 are not needed.

Although the lower support members 30 as depicted are shown as elongated, rectangular members, in other embodiments, the lower support members 30 may be any other size and/or shape (e.g., a flat plate, an elongated round member, etc.) that is capable of supporting the stand 10 above a ground surface 12.

An adjustment portion 40 may be coupled to the top end 24 of the frame support member 20 for movably coupling an arm 50 to the frame support member 20. The arm 50 may be movable relative to the frame support member 20 and/or adjustment portion 40 along a linear axis (e.g., a vertical axis). In this embodiment, the adjustment portion 40 includes a tubular member 41 defining a passageway extending along vertical axis 92. The passageway may be sized such that the arm 50 fits within the passageway 48 for vertical movement along the vertical axis 92. In other embodiments, the arm 50 may be movably coupled to the adjustment portion 40 and/or the top end 24 of the frame support member 20 in other manners than depicted for various directions of movement.

In at least one embodiment, the adjustment portion 40 may be integrated with the frame support member 20 such that the frame support member 20 and the adjustment portion 40 may define a single, integral unit. In other embodiments, for example as depicted, the adjustment portion 40 may be a separate unit that is coupled, e.g., welded, to the top end 24 of the frame support member 20.

The arm 50 extends from a proximal end 52 to a distal end 54 and at least a portion of the arm 50 lies along the vertical axis 92 when movably coupled to the adjustment portion 40. The vertical axis 92 is perpendicular to the ground surface 12. The arm 50 may further include an upper portion 58 that extends away from the vertical axis 92. As depicted, the upper portion 58 extends away from the opposite half of the stand 10. The arm 50, however, may be "reversed" within the passageway of the adjustable portion 40 such that the upper portion 58 extends towards the opposite half of the stand 10. In at least one embodiment, the upper portion 58 may extend from the vertical axis 92 at about a 45 degree angle.

As described herein, the arm 50 is adjustably coupled to the adjustment portion 40 (or to the top end 24 of the frame support member 20) such that the arm 50 may be adjusted relative to a ground surface 12. In the embodiment depicted, the arm 50 is movable along vertical axis 92. In other embodiments, the arm 50 may be movable in any direction. For example, the arm 50 may be configured to be adjustable or movable at 45 degree angle relative to the ground surface thereby vertically and horizontally movable at the same time. After adjustment, the arm 50 may be locked into a fixed position using pin 42 and/or retention handle 46.

When the arm 50 is locked in a fixed position, a pin 42 may be inserted into an adjustment pin aperture 43 of the adjustment portion 40. The adjustment pin aperture 43 extends through the tubular member 41 (e.g., through a first wall into the passageway and through the second wall opposite the first). In other embodiments, the adjustment pin aperture 43 may only extend through a single wall of the tubular member 41. Still, in other embodiments, any other locking structure may be utilized to lock the arm 50 in a fixed position.

The arm 50 defines a plurality of arm pin apertures 56 extending through the arm 50 for receiving at least a portion of the pin 42. The pin 42 may extend through the adjustment pin aperture 43 into one of the plurality of arm pin apertures 56 to lock the arm 50 relative to the adjustment portion 40. A user may remove the pin 42 from the arm pin aperture 56 and move the arm 50 (e.g., at least in one embodiment, downwardly or upwardly along vertical axis 92) relative to the adjustment portion 40 and/or the ground surface 12. After the user has desirably positioned the arm 50, the user may reinsert the pin 42 into one of the arm pin apertures 56 to lock the arm 50 relative to the adjustment portion 40.

The retention handle 46 may be coupled to the adjustment portion 40 so as to engage the arm 50 to inhibit the movement of the arm 50. For example, a portion of the retention handle 46 may be threaded for coupling to a threaded aperture of the adjustment portion 40 such that rotation of the retention handle 46 may move a portion of the retention handle 46 further into the passageway of the tubular member 41 to engage the arm 50. Such engagement may apply pressure to the arm 50 to inhibit the movement of the arm 50 (e.g., to secure the horizontal movement of arm 50).

In other embodiments, the arm 50 may be configured to be adjustable in any direction relative to the adjustment portion 40 (e.g., vertically, horizontally, and/or rotatably). For example, in one embodiment, the arm 50 may be rotatably moveable relative to the adjustment portion (e.g., the adjustment portion may be a circular tube within which the arm may rotate). Further, for example, in another embodiment, the arm 50 may be configured to be adjustable at 45 degree angle relative to the ground surface thereby vertically and horizontally moving at the same time.

A resting member 70 is pivotally coupled to the distal end 54 of the arm 50 for pivotal movement about a pivot axis 94. In the embodiment depicted, the resting member includes a support tab 74 that extends from the resting member 70 for use in pivotally coupling the resting member 70 to the distal end 54 of the arm 50. The pivot axis 94 may be perpendicular to the vertical axis 92, parallel to the pivot axis 90, and/or parallel to the ground surface 12.

As described herein, the resting member 70 is movable in at least two separate ways: movement about the pivot axis 94 and vertical movement relative to the ground surface 12 (e.g., through the vertical movement of the arm 50). Further, the resting member 70 is adjustable about the pivot axis 94 separately from the vertical movement relative to the ground surface 12. For example, the resting member 70 may be adjusted about the pivot axis 94 without adjusting the resting member 70 vertically and vice versa.

Still further, vertical movement of the resting member 70 relative to the ground surface 12 may be linear movement or may not be linear movement. For example, the adjustment portion 40 of the stand 10 may allow adjustment of the arm 50 along an axis that is not vertically aligned (e.g., the adjustment portion 40 may allow adjustment of the arm 50 along a line that is approximately 45 degrees from a vertical axis and/or the ground surface 12). Further, for example, the adjustment portion 40 and the arm 50 may be curved such that when the arm 50 is moved relative the adjustment portion 40, the resting member 70 may be moved both horizontally and vertically. Although these examples describe utilization of different configurations of the adjustment portion 40 and the arm 50 to facilitate the vertical movement of the resting member 70, other embodiments may include various structures and/or components to facilitate the vertical movement and/or movement about the pivot axis of the resting member 70.

In the embodiment depicted, the stand 10 further includes a pivot locking structure 60 to lock the resting member 70 in one of a plurality of positions about the pivot axis 94. The pivot locking structure 60 includes a locking plate 66 having a plurality of locking apertures 65 coupled to the distal end 54 of the arm 50. The pivot locking structure 60 further includes a release handle 62 for engaging one of the plurality of locking apertures 65 of the locking plate 66 to lock the position of the resting member 70 in one of the plurality of positions about the pivot axis 94.

The release handle 62 may be movably coupled to tab members 76 extending from the resting member 70 and may be biased by, e.g., spring 64, to engage one of the plurality of locking apertures 65 of the locking plate 66 such that the release handle 62 may not unintentionally be disengaged from the locking plate 66. The release handle 62 may extend from a proximal end 68 to a distal end 69. A user may grasp (and, for example, pull back) the distal end 68 of the release handle 62 to release (e.g., un-lock) the resting member 70 for movement about the pivot axis 94. The distal end 69 may be the portion of the release handle 62 that engages the locking apertures 65 of the locking plate 66. After a user has positioned the resting member 70, the user may release the release handle 62 to re-lock the resting member 70 in a fixed position.

Figure 6:
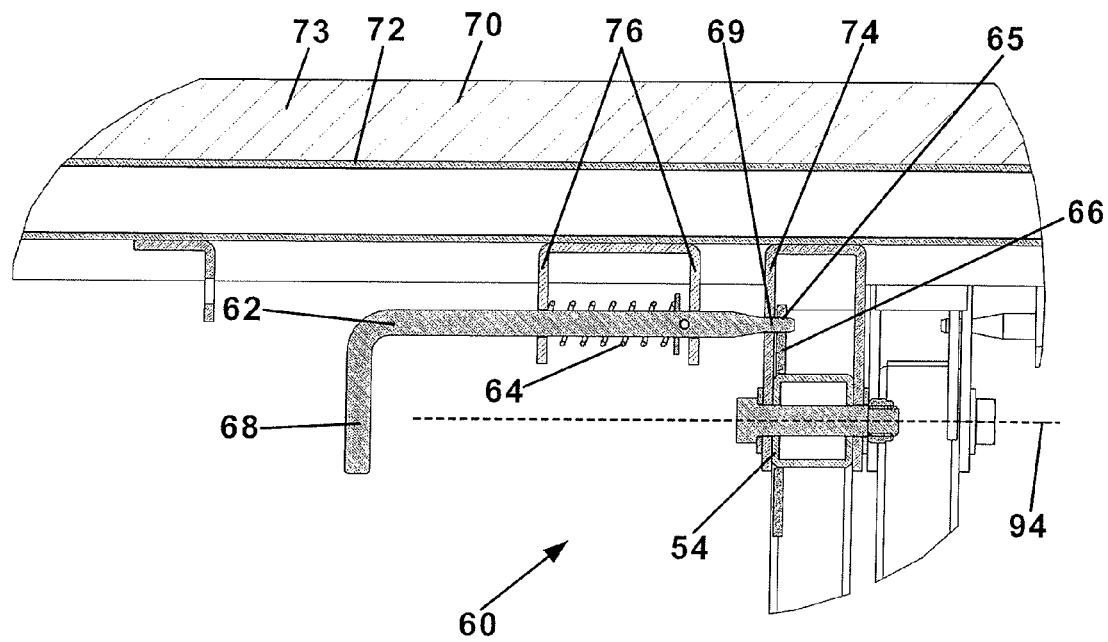
FIG. 6 is an expanded cross-sectional view of a portion of the adjustable stand of FIG. 1.
The figures are rendered primarily for clarity and, as a result, are not necessarily drawn to scale.

An expanded cross-sectional view of a portion of the stand 10 including the pivot locking structure 60 is shown in FIG. 6. As shown, the release handle 62 is engaging one of the plurality of locking apertures 65 of the locking plate 66 so as to lock the resting member 70 in one of the plurality of positions about the pivot axis 94.

The resting members 70 may be adjusted such that an object, e.g., an automobile panel, may be contacted and held by the resting members 70. Each resting member may include a resting support member 72 and a resting pad 73. The resting pad 73 may surround at least a portion of the exterior surface of resting support member 72 to protect the object received by the stand 10 from, e.g., scratches. The resting pad 73 may have a width 14 of about 2 inches to about 8 inches (e.g., 3.5 inches) and a height 16 of about 2 inches to about 8 inches (e.g., 2.5 inches) (see FIG. 2).

The stand 10 and the components therefore (e.g., the frame support members, lower support members, etc.) may be formed of, e.g., steel, aluminum, polymer, and/or any other material as would be known by one having skill in the art. Further, the components may be hollow, solid, circular, square, and/or any other shape, size, or configuration as would be known by one having skill in the art. Still further, such components may be coupled using various techniques including, e.g., welding, adhering, bolting, etc. Also, although not depicted, rubber sleeves may be provided around portions of the stand 10 to protect such portions from paint.

The adjustable stand described herein may be utilized by a user to receive an object. At least one method of adjusting a stand includes adjusting each arm relative to the ground surface and adjusting each resting member about its pivot axis.

For example, a user may adjust each arm 50 by releasing the arm 50 from the adjustment portion 40. The user may release the arm 50 from the adjustment portion 40 by removing pin 42 from the pin aperture 43 of the adjustment portion 40 and also by loosening the retention handle 46 from engaging the arm 50. After the arm 50 is released, the user may grasp a portion of the arm 50 (e.g., the proximal end 52), or any component coupled to the arm 50, to move the arm 50 relative to the adjustment portion 40 and/or ground surface 12. After the user has positioned the arm 50, the user may re-lock the arm 50 using the pin 42 and retention handle 46.

Further, the user may pivotally adjust each resting member 70 about its pivot axis 94. The user may release the resting member 70 by grasping and pulling the proximal end 68 of the release handle 62 to remove the distal end 69 from a locking aperture 65 of the locking plate 66. After the resting member 60 is released, the user may grasp the resting member 70, or any component coupled to the resting member 70 (e.g., the release handle 62), to move the resting member 70 about the pivot axis 94. After the user has positioned the resting member 70, the user may re-lock the resting member 70 by releasing the release handle 62 such that the distal end 69 may re-engage a locking aperture 65 of the locking plate 66. Although in this embodiment the release handle 62 is biased such that a user may need to hold the release handle 62 while adjusting the resting member 70, in other embodiments, the release handle 62 may not be biased, may be lockable in an unlocked position, etc.

In the embodiment depicted, the stand 10 includes two arms 50 and two resting members 70. Only one or both arms 50 and/or only one or both resting members 70 may be adjusted if a user desires. In other embodiments having more than two arms and/or resting members, a user may adjust any number of the arms and/or resting members to provide for receiving an object.

The complete disclosure of the patents, patent documents, and publications cited in the Background, the Detailed Description of Exemplary Embodiments, and elsewhere herein are incorporated by reference in their entirety as if each were individually incorporated.

Illustrative embodiments of this invention are discussed and reference has been made to possible variations within the scope of this invention. These and other variations, combinations, and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

The invention claimed is:

1. A stand for receiving an object comprising:
   first and second frame support members, wherein each of the first and the second frame support members extends from a bottom end to a top end, wherein the first frame support member is coupled to the second frame support member at a crossing location located between the bottom end and the top end of each of the first and the second frame support members;
   first and second lower support members for engaging a ground surface, wherein the first lower support member is coupled to the bottom end of the first frame support member, wherein the second lower support member is coupled to the bottom end of the second frame support member;
   first and second adjustment portions, wherein the first adjustment portion is coupled to the top end of the first frame support member, wherein the first adjustment portion defines a first vertical axis, wherein the second adjustment portion is coupled to the top end of the second frame support member, wherein the second adjustment portion defines a second vertical axis;
   first and second arms, wherein each of the first and the second arms extends from a proximal end to a distal end, wherein the first arm is adjustably coupled to the first adjustment portion for movement along the first vertical axis, wherein the second arm is adjustably coupled to the second adjustment portion for movement along the second vertical axis; and
   first and second resting members for contacting the object when received by the stand, wherein the first resting member is pivotally coupled to the distal end of the first arm for movement about a first pivot axis, wherein the second resting member is pivotally coupled to the distal end of the second arm for movement about a second pivot axis.

2. The stand of claim 1, wherein the first pivot axis is perpendicular to the first vertical axis, and wherein the second pivot axis is perpendicular to the second vertical axis.

3. The stand of claim 1, wherein the first frame support member is pivotally coupled to the second frame support member at the crossing location located between the bottom end and the top end of each of the first and the second frame support members.

4. The stand of claim 3, wherein the stand further comprises a coupling element coupled to each of the first and the second frame support members to maintain the first and the second frame support members in a particular crossing configuration when the stand is in a use position, wherein the top ends of the first and the second frame support member are positioned away from each other when in the use position.

5. The stand of claim 1, wherein the stand further comprises a first and a second pivot locking structure, wherein the first pivot locking structure is located proximate the distal end of the first arm to lock the first resting member in one of a plurality of positions about the first pivot axis, wherein the second pivot locking structure is located proximate the distal end of the second arm to lock the second resting member in one of a plurality of positions about the second pivot axis.

6. The stand of claim 5, wherein the first pivot locking structure comprises:
    a first locking plate comprising a plurality of locking apertures, wherein the first locking plate is coupled to the distal end of the first arm; and
    a first release handle for engaging one of the plurality of locking apertures of the first locking plate to lock the position of the first resting member in one of the plurality of positions about the first pivot axis, wherein the first release handle is movably coupled to the first resting member;
wherein the second pivot locking structure comprises:
    a second locking plate comprising a plurality of locking apertures, wherein the second locking plate is coupled to the distal end of the second arm; and
    a second release handle for engaging one of the plurality of locking apertures of the second locking plate to lock the position of the second resting member in one of the plurality of positions about the second pivot axis, wherein the second release handle is movably coupled to the second resting member.

7. The stand of claim 1, wherein each of the first and the second adjustment portions comprises a tubular portion defining a passageway, wherein the passageway of the tubular portion of the first adjustment portion receives at least a portion of the first arm, wherein the passageway of the tubular portion of the second adjustment portion receives at least a portion of the second arm.

8. The stand of claim 7, wherein each of the first and the second adjustment portions further comprises a pin, wherein each tubular portion of the first and the second adjustment portions defines an adjustment pin aperture for receiving the pin, wherein the adjustment pin aperture extends from the outside of the tubular portion into the passageway of the tubular portion, wherein each of the first and the second arms defines a plurality of arm pin apertures extending into the arm for receiving the pin, wherein at least a portion of the pin extends through the adjustment pin aperture of the tubular portion into one of the plurality of arm pin apertures of the arm when in a locked position.

9. The stand of claim 7, wherein each of the first and the second adjustment portions further comprises a retention handle, wherein each tubular portion of the first and the second adjustment portions defines a retention handle aperture extending from the outside of the tubular portion into the passageway of the tubular portion for receiving the retention handle, wherein at least a portion of the retention handle extends through the retention handle aperture to engage a surface of the arm to inhibit movement of the arm in the passageway.

10. The stand of claim 1, wherein each of the first and the second lower support members extends from a first end to a second end, wherein the first lower support member is orthogonal to the first frame support member, wherein the second lower support member is orthogonal to the second frame support member.

11. The stand of claim 1, wherein each of the first and the second resting member comprises:
    a resting support member; and
    a resting pad configured to at least partially surround the resting support member, wherein the resting pad has a width of at least 3.5 inches.

12. A stand for receiving an object comprising:
    first and second frame support members, wherein each of the first and the second frame support members extends from a bottom end to a top end, wherein the first frame support member is coupled to the second frame support member; and
    first and second resting members for contacting the object when received by the stand, wherein the first resting member is adjustably coupled to the top end of the first frame support member for vertical movement and for movement about a first pivot axis, wherein the first resting member is adjustable for movement about the first pivot axis separately from the adjustment of the vertical movement of the first resting member, wherein the second resting member is adjustably coupled to the top end of the second frame support member for vertical movement and for movement about a second pivot axis, wherein the second resting member is adjustable for movement about the second pivot axis separately from adjustment of the vertical movement of the second resting member, wherein the first pivot axis and the second pivot axis are parallel.

13. The stand of claim 12, wherein the first frame support member is pivotally coupled to the second frame support member at a crossing location located between the bottom end and the top end of each of the first and the second frame support members.

14. The stand of claim 12, wherein the stand further comprises a first and a second lower support member for engaging a ground surface, wherein the first lower support member is coupled to the bottom end of the first frame support member, wherein the second lower support member is coupled to the bottom end of the second frame support member.

15. The stand of claim 12, wherein the vertical movement of the first resting member is parallel the vertical movement of the second resting member.

16. A stand for receiving an object comprising:
    first and second frame support members, wherein each of the first and the second frame support members extends from a bottom end to a top end, wherein the first frame support member is coupled to the second frame support member at a crossing location located between the bottom end and the top end of each of the first and the second frame support members;
    first and second arms, wherein each of the first and the second arms extends from a proximal end to a distal end, wherein the first arm is adjustably coupled to the top end of the first frame support member for vertical movement, wherein the second arm is adjustably coupled to the top end of the second frame support member for vertical movement; and first and second resting members for contacting the object when received by the stand, wherein the first resting member is pivotally coupled to the distal end of the first arm for movement about a first pivot axis, wherein the second resting member is pivotally coupled to the distal end of the second arm for movement about a second pivot axis.

17. The stand of claim 16, wherein the first arm is adjustably coupled to the top end of the first frame support member for movement along a first vertical axis, wherein the second arm is adjustably coupled to the top end of the second frame support member for movement along a second vertical axis.

18. A method of adjusting a stand for receiving an object comprising:

providing a stand comprising:

first and second frame support members, wherein each of the first and the second frame support members extends from a bottom end to a top end, wherein the first frame support member is coupled to the second frame support member at a crossing location located between the bottom end and the top end of each of the first and the second frame support members;

first and second arms, wherein each of the first and the second arms extends from a proximal end to a distal end, wherein the first arm is adjustably coupled to the top end of the first frame support member for vertical movement, wherein the second arm is adjustably coupled to the top end of the second frame support member for vertical movement; and first and second resting members for contacting the object when received by the stand, wherein the first resting member is pivotally coupled to the distal end of the first arm for movement about a first pivot axis, wherein the second resting member is pivotally coupled to the distal end of the second arm for movement about a second pivot axis;

adjusting the first arm vertically;

adjusting the second arm vertically;

adjusting the first resting member about the first pivot axis; and adjusting the second resting member about the second pivot axis.

19. The method of claim 18, wherein the vertical movement of the first resting member is parallel the vertical movement of the second resting member.

20. The method of claim 18, wherein the first frame support member is pivotally coupled to the second frame support member at the crossing location between the bottom end and the top end of each of the first and the second frame support members, wherein the stand further comprises a coupling element coupled to each of the first and the second frame support members to maintain the first and the second frame support members in a particular crossing configuration when the first and the second frame support members are positioned in a use position, wherein the top ends of the first and the second frame support member are positioned away from each other when in the use position, wherein the method further comprises adjusting the width between the top ends of the first and the second frame support members by adjusting the length of the coupling member.

* * * * *